United States Patent [19]

Yamada

[11] 4,371,270

[45] Feb. 1, 1983

[54] BLOCK SIGNAL FORMING DIGITAL PROCESSOR WITH ERROR CORRECTION

[75] Inventor: Yasuhiro Yamada, Fujisawa, Japan

[73] Assignee: Victor Company of Japan, Ltd., Yokohama, Japan

[21] Appl. No.: 266,611

[22] Filed: May 22, 1981

Related U.S. Application Data

[63] Continuation of Ser. No. 85,320, Oct. 16, 1979, abandoned.

[30] Foreign Application Priority Data

Oct. 17, 1978 [JP] Japan .............................. 53-127718

[51] Int. Cl.³ ............................................ G06F 11/10
[52] U.S. Cl. ...................................................... 371/38
[58] Field of Search .................................... 371/38, 37

[56] References Cited

U.S. PATENT DOCUMENTS 3,697,948 10/1972 Bossen .................................... 371/38
3,836,957 9/1974 Duke et al. ........................... 371/38
3,913,068 10/1975 Patel ...................................... 371/38

Primary Examiner—David H. Malzahn
Attorney, Agent, or Firm—Michael N. Meller; Anthony H. Handal

[57] ABSTRACT

A digital signal processing circuit in which a first correction signal generation circuit forms a first signal P for correction by a modulus 2 addition of m (a given integer) generation elements. These are picked out as a unit, without including same generation element each other, from a group S composed of a plurality of generation elements. Each of the latter is a digital signal of one sampling period among digital signals obtained by digital processing (pulse code modulation) an information signal with a specific sampling. A second correction signal generation circuit forms a second signal Q for correction by a modulus 2 addition of n (a given integer) generation elements which are picked out as a unit from the group S in such a manner that the generation elements thus picked out do not include the same generation element each other. The number of common essential elements of generation element of said first correction signal P is considered to be one (unity) or less. A block signal forming device picks out output L/m first correction signals P and L/n second correction signals Q (where L being common multiple of m and n) respectively out of groups of the first and second correction signals P and Q. These groups are formed by using once all of the generation elements of the group S led out of the first and second correction signal generation circuits and moreover for picking out L generation elements out of the group S.

8 Claims, 5 Drawing Figures

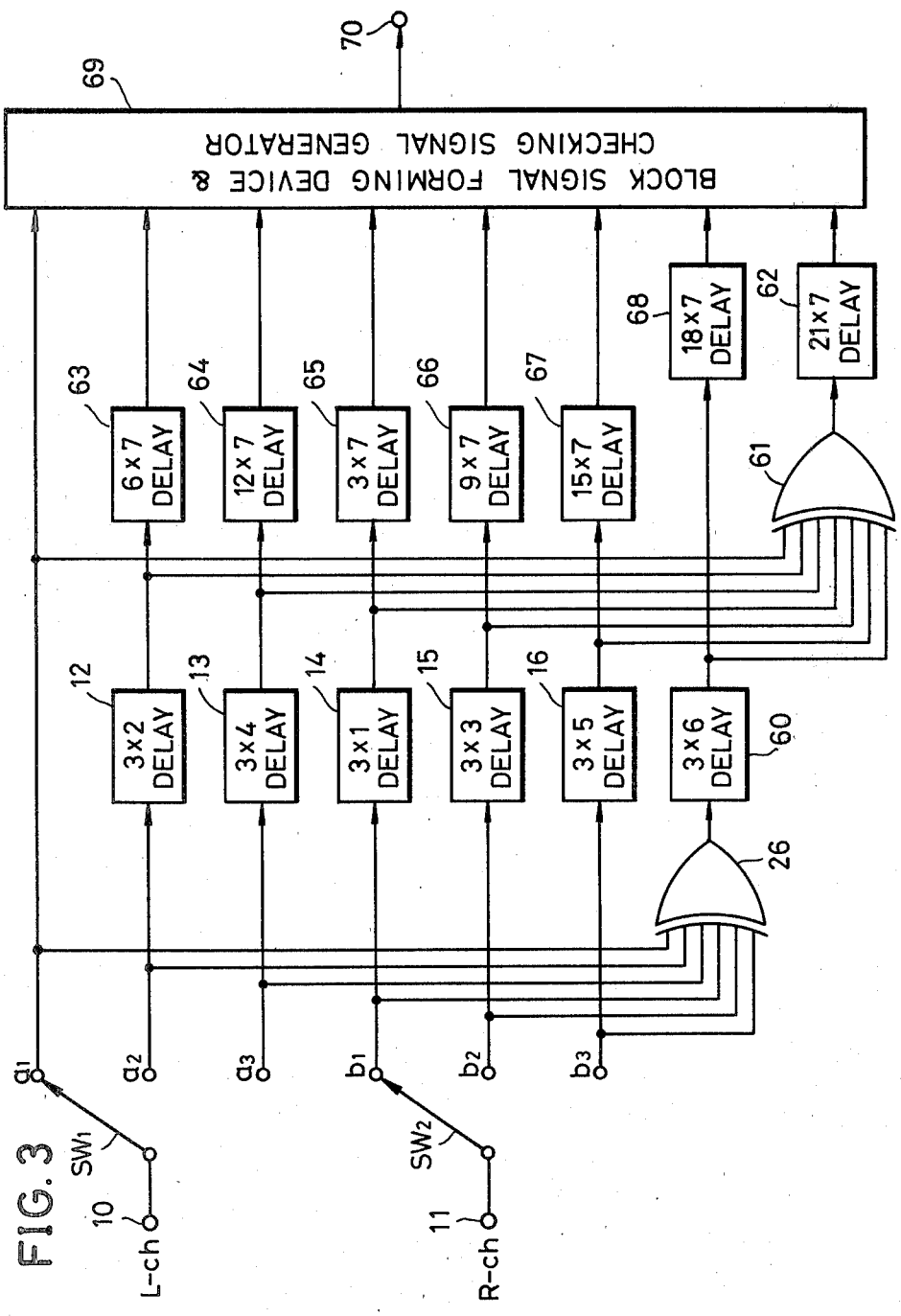

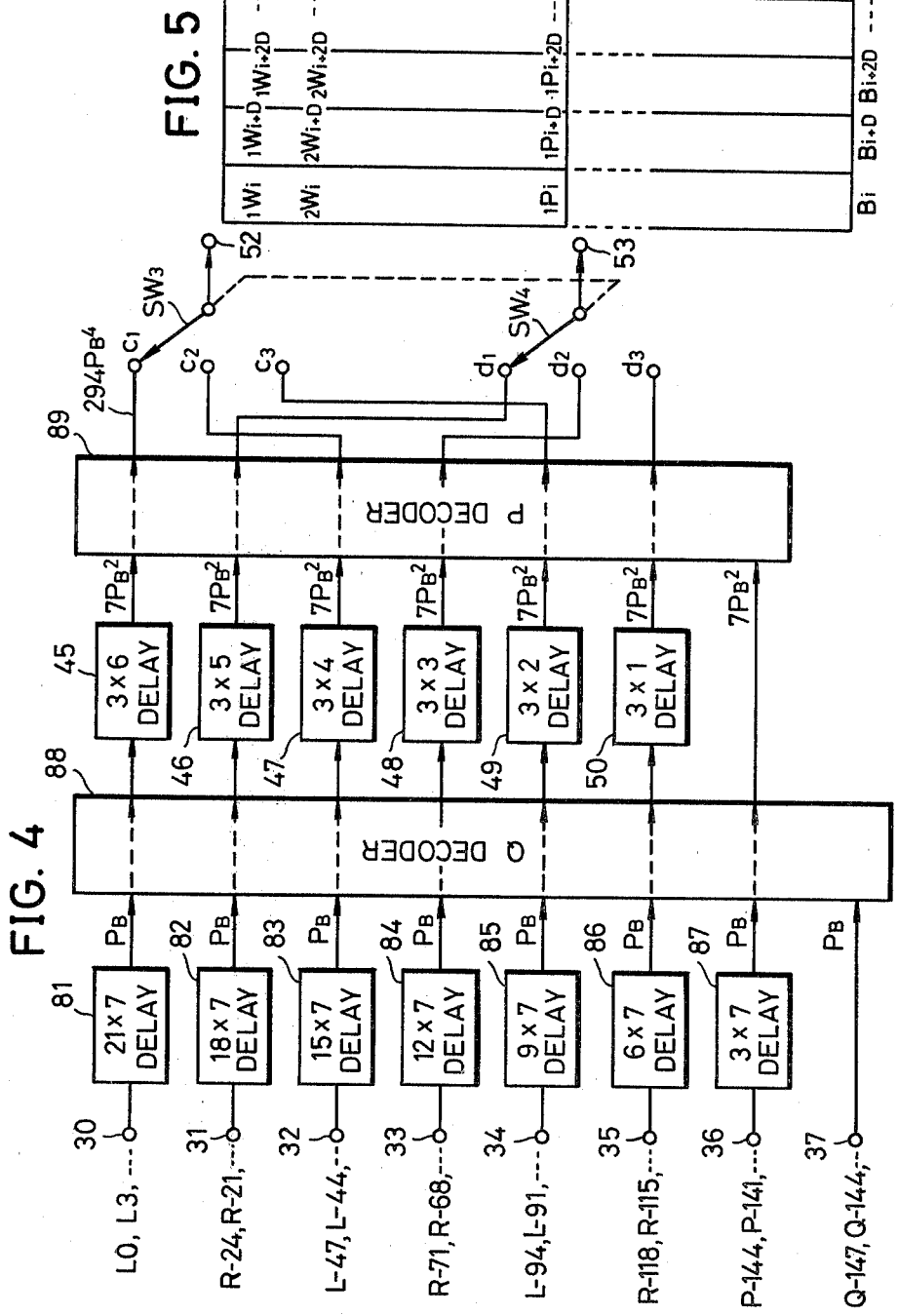

BLOCK SIGNAL FORMING DIGITAL PROCESSOR WITH ERROR CORRECTION

This is a continuation of application Ser. No. 85,320 filed Oct. 16, 1979 now abandoned.

BACKGROUND OF THE INVENTION

The present invention relates generally to digital signal processing apparatuses. More particularly, the invention relates to an apparatus in which, from among modulated digital signals obtained by digital signal processing from an analog information signal by a modulation method such as pulse code modulation (PCM) or difference modulation, a plurality of coded signals of every constant period are consolidated as one block and recorded in this block unit on a recording medium, and which, in the operation of reproducing these recorded signals, is capable of accurately reproducing without error the above mentioned analog information signal from the reproduced plurality of block signals even when a portion of the reproduced signals is missing.

In a known recording and reproducing apparatus for audio signals which records and reproduces an analog audio signal, as it is, on and from a traveling magnetic tape by means of a stationary head, there have unavoidably been a number of problems such as wow and flutter of tape travel and noise and distortion arising in the tape and head system. As a natural consequence, these problems impose limitations when it is desired to increase the quality of recording and reproducing audio signals.

Accordingly, a method which comprises converting an analog audio signal in a modulated digital signal (hereinafter referred to simply as "digital signal") by a modulation method such as pulse code modulation (PCM) and recording and reproducing this digital signal is being developed. By this method, problems such as those relating to the S/N ratio and distortion due to nonlinearity of the recording medium are solved to a considerable degree.

For recording and reproducing this digital signal, recording and reproducing systems of wider frequency band or greater number of channels in comparison with those of a systems for recording and reproducing analog signals are required. Accordingly, for this recording and reproducing apparatus, the use of a so-called video tape recorder (hereinafter referred to as VTR) which has heretofore been widely sold on the market as an apparatus for recording and/or reproducing composite video signals has reached a practical stage. The term "composite video signal" is used in the present specification to designate a signal which results from the addition of synchronizing signals such as a vertical synchronizing signal equalizing pulses, and a horizontal synchronizing signal to a video information signal. A VRT of this character is capable of recording/reproducing video signals of wide frequency band by means of rotary heads which trace with a relatively high relative tracing speed over oblique tracks on a traveling magnetic tape.

Recording of an audio signal by using this VTR is accomplished by converting the analog audio signal to be recorded into a digital signal, and causing this digital signal to exist between synchronizing signals which are the same as the synchronizing signals of an ordinary composite video signal in an adapter apparatus connected to the VTR, supplying the composite digital signal thus obtained to the VTR, and recording this signal by means of rotary heads on the magnetic tape. At the time of reproduction, the signal reproduced from the magnetic tape by rotary heads in the VTR is supplied to the adapter apparatus, where the synchronizing signals are removed, and the resulting digital signal is converted into an analog signal, thereby being restored into the original audio signal.

In the case where dust particles adhere to the surface of the above mentioned magnetic tape, or in the case where there are irregularities in the magnetic material of the tape, a signal loss or dropout occurs in one portion of the reproduced signal. In the case where this occurs, and the reproduction of the most significant bit (MSB), for example, is lost, the signal obtained by decoding will become a signal of considerably large erroneous value. If this signal is converted, as it is, into an analog signal and reproduced, it will accompany with a high noise voltage, and the reproduced sound will have an unpleasant quality.

As a countermeasure, there has heretofore been a method wherein the error is detected, and the modulated digital signal reproduced with error is substituted into that of the preceding sample. This method is called as a preceding value holding method. Another method employed heretofore substitutes the modulated digital signal reproduced with error into the center value of the values before and after sampling of the digital signal. This method is called as a center value correction method.

It has been the practice heretofore to resort to a method as described above to moderate the deterioration of the sound quality as sensed by ear of the reproduced sound at the time when partial dropout occurrs in the reproduced modulated digital signal. These methods known in the prior art, however, could not be ordinarily expected to be satisfactorily effective in lessening the deterioration of the reproduced sound of an audio signal whose level or frequency is abruptly varying.

Accordingly, there has heretofore been a method which comprises: forming a signal P for correction by a modulus 2 addition from m generation elements by a predetermined mode out of an aggregation $ comprising a plurality of signals (digital signals of one sampling period) coded every constant period out of the digital signals obtained coding after sampling the analog information signal, the m generation elements being coded signals constituting the aggregation $; similarly using once all of the constituent elements of the aggregation $ thereby to form a group of the signal P for correction; composing a block from one correction signal P from the group, an element other than its generation elements, and an error checking signal; recording by block units a plurality of blocks which have been similarly constituted; and, in the case where the generation elements of the aggregation $ are lost at the time of reproduction, using the correction signals P having these as generation elements to restore the same to the original signals. This type of the conventional apparatus is described, for example, in the specification of U.S. Pat. No. 3,697,948.

This conventional apparatus is not capable of restoring when the signal for correction concurrently includes more than two erroneous generation elements. Specifically, since a single block contains only one kind of correction signal, the conventional apparatus has been accompanied by difficulties in that the probability of failure in restoration is rather high.

SUMMARY OF THE INVENTION

Accordingly, it is a general object of the present invention to provide a novel and useful digital signal processing apparatus wherein the above described difficulties involved in the known apparatus have been overcome.

Another and more specific object of the invention is to provide an apparatus for accomplishing digital signal processing in such a manner that two kinds of correction signal included in a single block and the generation elements of the two kinds of correction signals belonging to mutually different blocks are recorded and reproduced, and the reproduced digital signal is restored to the original signal. According to the digital signal processing apparatus of the present invention, the probability of failure in restoration of the elements becomes very low, compared to that in the known apparatus, thus capable of accomplishing recording and reproduction with high quality.

Another object of the present invention is to provide a digital signal processing apparatus in which two kinds of correction signals are generated independently to each other and are then recorded and reproduced. Here, since the two kinds of correction signals are mutually independent, the digital signals processed and recorded by the apparatus of the present invention can also be reproduced by the known apparatus.

Still another object of the present invention is to provide a digital signal processing apparatus for accomplishing recording after processing in such a manner that one or more generation elements of one correction signal among two kinds of correction signals are included in the generation elements of the other correction signal and that both the correction signals and their generation elements are arranged so as to belong to mutually different blocks, and reproducing the signal thus recorded. According to the apparatus of the present invention is capable of further reducing the probability of failure in restoration of the generation element, compared to the apparatus in which, among two kinds of correction signals, one correction signal is not generated or formed using the other correction signal.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 3 is a block diagram showing the essential parts of the recording system of a second embodiment of the digital signal processing apparatus of the invention;

FIG. 4 is a block diagram showing the essential parts of the reproducing system of the second embodiment of the invention; and FIG. 5 is a diagram showing the word constitution of a signal for correction.

DETAILED DESCRIPTION OF THE INVENTION

Figure 1:
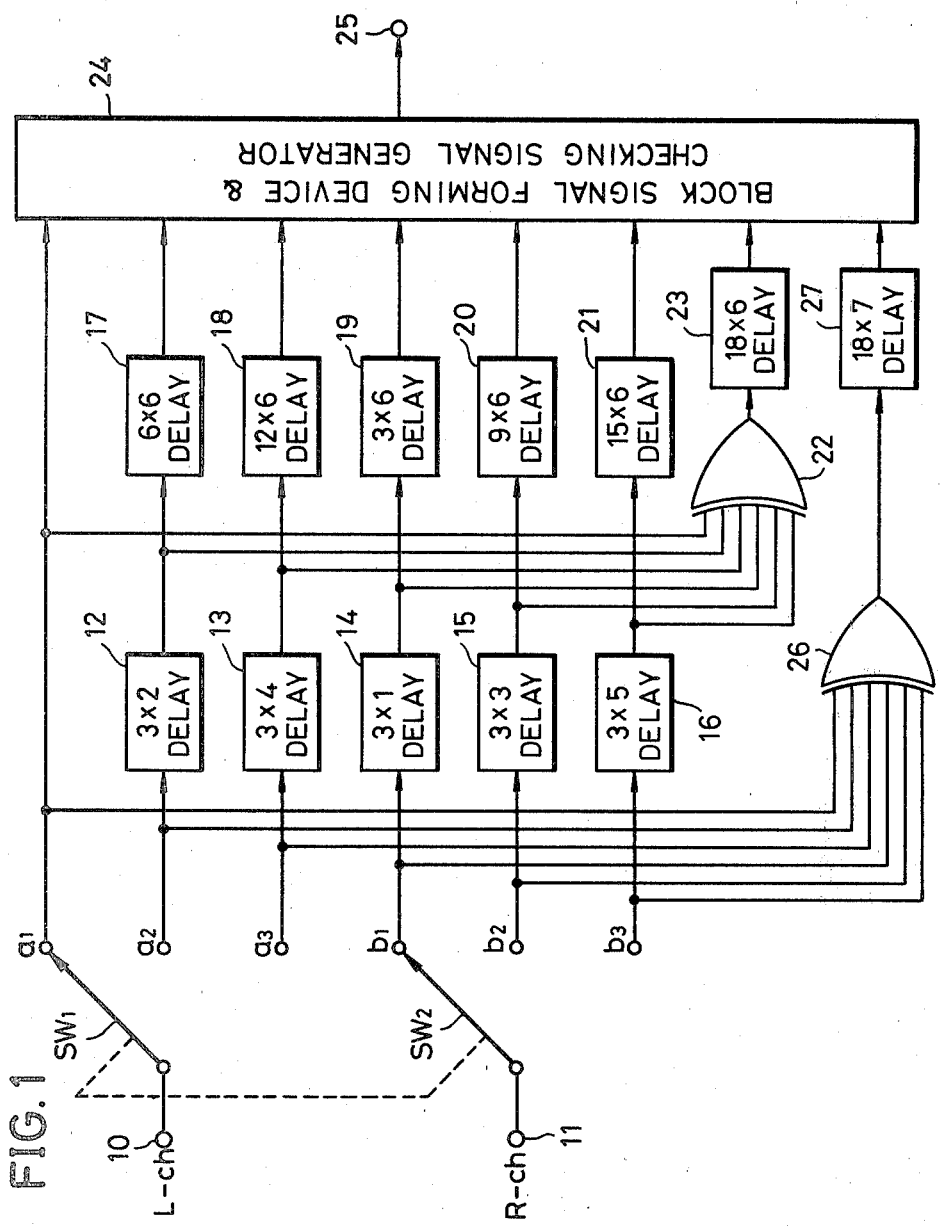
FIG. 1 is a block diagram showing the essential parts of the recording system of a first embodiment of the digital signal processing apparatus according to the present invention.

The first embodiment of the digital signal processing apparatus of the present invention will first be described with reference to FIGS. 1 and 2. In the recording system illustrated in FIG. 1, digital signals of the left channel (L-ch) and the right channel (R-ch) obtained as a result of sampling, quantizing, and coding stereo signals with specific periods are applied respectively to digital signal input terminals 10 and 11. Changeover switches SW1 and SW2 connected to these input terminals 10 and 11 are changed over in intercoupled operation respectively in synchronism with the above mentioned sampling period, the movable contacts of the switches SW1 and SW2 being respectively in contact with their contact points a1 and b1. In the succeeding sampling period, the movable contacts are switched to contact their contact points a2 and b2. Thereafter, the same movable contacts are similarly switched to contact their contact points a3 and b3→a1 and b1→, thus being successively switched to the contact points in synchronism with the sampling periods. Digital signals $L_0$, $R_0$, $L_1$, $R_1$—are thus obtained.

The inputs of the delay devices 12, 13, 14, 15, and 16 are connected to the contact points a2, a3, b1, b2, and b3 and delay the input signals respectively by $6(=3\times2)$, $12(=3\times4)$, $3(=3\times1)$, $9(=3\times3)$, and $15(=3\times5)$ sampling periods. The output signals of the delay devices 12 through 16 and the digital signal passing through the contact point a1 are supplied together to a 6-input, exclusive OR operational circuit 22, where a signal Q for correction is formed. This correction signal Q is fed to a delay device 23, where it is delayed by $108(=18\times6)$ sampling periods. Furthermore, the output signals of the above mentioned delay devices 12, 13, 14, 15, and 16 are respectively fed to delay devices 17, 18, 19, 20, and 21, where they are respectively delayed by $36(=6\times6)$, $72(=12\times6)$, $18(=3\times6)$, $54(=9\times6)$, and $90(=15\times6)$ sampling periods.

On one hand, the signals passing through the contact points a1, a2, and a3 and b1, b2 and b3 are fed to a 6-input, exclusive OR operational circuit 26, where the aforementioned modulus 2 addition is carried out, whereupon the correction signal P is generated. This correction signal P is delayed by $126(=18\times7)$ sampling periods by the delay device 27.

Here, the generation of the correction signal P by modulus 2 addition will be described. It will be assumed that signals $Si1$, $Si2$, and $Si3$ which have been coded every constant time period are, for example, two-value signals of 5 bits and are represented by the following equations.

$$\begin{matrix} Si1 = (0\ 1\ 1\ 0\ 1) \overset{\Delta}{=} (ai1, bi1, ci1, di1, ei1) \\ Si2 = (0\ 0\ 0\ 1\ 1) \overset{\Delta}{=} (ai2, bi2, ci2, di2, ei2) \\ Si3 = (1\ 1\ 0\ 0\ 1) \overset{\Delta}{=} (ai3, bi3, ci3, di3, ei3) \end{matrix} \quad (1)$$

The symbol "$\underline{\Delta}$" in Eq.(1) represents a definition.

When the generation elements $Si1$, $Si2$, and $Si3$ of the aforementioned aggregation $ are added with modulus 2 addition, the following solution is obtained.

$Si1 \oplus Si2 \oplus Si3$
$= (ai1 \oplus ai2 \oplus ai3, bi1 \oplus bi2 \oplus bi3, ci1 \oplus ci2 \oplus ci3,$
$\qquad di1 \oplus di2 \oplus di3, ei1 \oplus ei2 \oplus ei3)$ -continued
= (0 ⊕ 0 ⊕ 1, 1 ⊕ 0 ⊕ 1, 1 ⊕ 0 ⊕ 0, 0 ⊕ 1 ⊕ 0, 1 ⊕ 1 ⊕ 1)
= (1, 0, 1, 1, 1)

This result becomes the correction signal P.

The L-ch digital signal from the contact point a1 of the switch SW1 and the delayed output signals respectively of the delay devices 17 to 21, 23, and 27 are supplied to a block signal forming device and checking signal generator 24, where they are subjected to parallel-series conversion, and a cyclic redundancy check (CRC) signal is added thereto. A block signal is obtained every horizontal scanning period through an output terminal 25, combined with a composite synchronizing signal, thereby being rendered into a composite digital signal, and recorded by a VTR on a magnetic tape (not shown).

The relationships between the block numbers of the block signals obtained in this manner and the modulated digital signals constituting the block signals are as indicated in Table I. In addition, the relationships between the block numbers and the signals P and Q for correction are indicated in Table II. The CRC signal is omitted in the tables.

TABLE I

| H/0; | L 0 | R −21 | L −41 | R −62 | L −82 | R −103 |
|---|---|---|---|---|---|---|
| H/1; | L 3 | R −18 | L −38 | R −59 | L −79 | R −100 |
| H/2; | L 6 | R −15 | L −35 | R −56 | L −76 | R −97 |
| H/3; | L 9 | R −12 | L −32 | R −53 | L −73 | R −94 |
| H/4; | L 12 | R −9 | L −29 | R −50 | L −70 | R −91 |
| H/5; | L 15 | R −6 | L −26 | R −47 | L −67 | R −88 |
| H/6; | L 18 | R −3 | L −23 | R −44 | L −64 | R −85 |
| H/7; | L 21 | R 0 | L −20 | R −41 | L −61 | R −82 |
| H/8; | L 24 | R 3 | L −17 | R −38 | L −58 | R −79 |
| H/9; | L 27 | R 6 | L −14 | R −35 | L −55 | R −76 |
| H/10; | L 30 | R 9 | L −11 | R −32 | L −52 | R −73 |
| H/11; | L 33 | R 12 | L −8 | R −29 | L −49 | R −70 |
| H/12; | L 36 | R 15 | L −5 | R −26 | L −46 | R −67 |
| H/13; | L 39 | R 18 | L −2 | R −23 | L −43 | R −64 |
| H/14; | L 42 | R 21 | L 1 | R −20 | L −40 | R −61 |
| H/15; | L 45 | R 24 | L 4 | R −17 | L −37 | R −58 |
| H/16; | L 48 | R 27 | L 7 | R −14 | L −34 | R −55 |
| H/17; | L 51 | R 30 | L 10 | R −11 | L −31 | R −52 |
| H/18; | L 54 | R 33 | L 13 | R −8 | L −28 | R −49 |
| H/19; | L 57 | R 36 | L 16 | R −5 | L −25 | R −46 |
| H/20; | L 60 | R 39 | L 19 | R −2 | L −22 | R −43 |
| H/21; | L 63 | R 42 | L 22 | R 1 | L −19 | R −40 |
| H/22; | L 66 | R 45 | L 25 | R 4 | L −16 | R −37 |
| H/23; | L 69 | R 48 | L 28 | R 7 | L −13 | R −34 |
| H/24; | L 72 | R 51 | L 31 | R 10 | L −10 | R −31 |
| H/25; | L 75 | R 54 | L 34 | R 13 | L −7 | R −28 |
| H/26; | L 78 | R 57 | L 37 | R 16 | L −4 | R −25 |
| H/27; | L 81 | R 60 | L 40 | R 19 | L −1 | R −22 |
| H/28; | L 84 | R 63 | L 43 | R 22 | L 2 | R −19 |
| H/29; | L 87 | R 66 | L 46 | R 25 | L 5 | R −16 |
| H/30; | L 90 | R 69 | L 49 | R 28 | L 8 | R −13 |
| H/31; | L 93 | R 72 | L 52 | R 31 | L 11 | R −10 |
| H/32; | L 96 | R 75 | L 55 | R 34 | L 14 | R −7 |
| H/33; | L 99 | R 78 | L 58 | R 37 | L 17 | R −4 |
| H/34; | L 102 | R 81 | L 61 | R 40 | L 20 | R −1 |
| H/35; | L 105 | R 84 | L 64 | R 43 | L 23 | R 2 |
| H/36; | L 108 | R 87 | L 67 | R 46 | L 26 | R 5 |
| H/37; | L 111 | R 90 | L 70 | R 49 | L 29 | R 8 |
| H/38; | L 114 | R 93 | L 73 | R 52 | L 32 | R 11 |
| H/39; | L 117 | R 96 | L 76 | R 55 | L 35 | R 14 |
| H/40; | L 120 | R 99 | L 79 | R 58 | L 38 | R 17 |
| H/41; | L 123 | R 102 | L 82 | R 61 | L 41 | R 20 |
| H/42; | L 126 | R 105 | L 85 | R 64 | L 44 | R 23 |
| H/43; | L 129 | R 108 | L 88 | R 67 | L 47 | R 26 |

TABLE II

| H/0; | P-126-126-125-125-124-124 | Q-108-111-113-116-118-121 |
|---|---|---|
| H/1; | P-123-123-122-122-121-121 | Q-105-108-110-113-115-118 |
| H/2; | P-120-120-119-119-118-118 | Q-102-105-107-110-112-115 |
| H/3; | P-117-117-116-116-115-115 | Q -99-102-104-107-109-112 |
| H/4; | P-114-114-113-113-112-112 | Q -96 -99-101-104-106-109 |
| H/5; | P-111-111-110-110-109-109 | Q -93 -96 -98-101-103-106 |
| H/6; | P-108-108-107-107-106-106 | Q -90 -93 -95 -98-100-103 |
| H/7; | P-105-105-104-104-103-103 | Q -87 -90 -92 -95 -97-100 |
| H/8; | P-102-102-101-101-100-100 | Q -84 -87 -89 -92 -94 -97 |
| H/9; | P -99 -99 -98 -98 -97 -97 | Q -81 -84 -86 -89 -91 -94 |
| H/10; | P -96 -96 -95 -95 -94 -94 | Q -78 -81 -83 -86 -88 -91 |
| H/11; | P -93 -93 -92 -92 -91 -91 | Q -75 -78 -80 -83 -85 -88 |
| H/12; | P -90 -90 -89 -89 -88 -88 | Q -72 -75 -77 -80 -82 -85 |
| H/13; | P -87 -87 -86 -86 -85 -85 | Q -69 -72 -74 -77 -79 -82 |
| H/14; | P -84 -84 -83 -83 -82 -82 | Q -66 -69 -71 -74 -76 -79 |
| H/15; | P -81 -81 -80 -80 -79 -79 | Q -63 -66 -68 -71 -73 -76 |
| H/16; | P -78 -78 -77 -77 -76 -76 | Q -60 -63 -65 -68 -70 -73 |
| H/17; | P -75 -75 -74 -74 -73 -73 | Q -57 -60 -62 -65 -67 -70 |
| H/18; | P -72 -72 -71 -71 -70 -70 | Q -54 -57 -59 -62 -64 -67 |
| H/19; | P -69 -69 -68 -68 -67 -67 | Q -51 -54 -56 -59 -61 -64 |
| H/20; | P -66 -66 -65 -65 -64 -64 | Q -48 -51 -53 -56 -58 -61 |
| H/21; | P -63 -63 -62 -62 -61 -61 | Q -45 -48 -50 -53 -55 -58 |
| H/22; | P -60 -60 -59 -59 -58 -58 | Q -42 -45 -47 -50 -52 -55 |
| H/23; | P -57 -57 -56 -56 -55 -55 | Q -39 -42 -44 -47 -49 -52 |
| H/24; | P -54 -54 -53 -53 -52 -52 | Q -36 -39 -41 -44 -46 -49 |
| H/25; | P -51 -51 -50 -50 -49 -49 | Q -33 -36 -38 -41 -43 -46 |
| H/26; | P -48 -48 -47 -47 -46 -46 | Q -30 -33 -35 -38 -40 -43 |
| H/27; | P -45 -45 -44 -44 -43 -43 | Q -27 -30 -32 -35 -37 -40 |
| H/28; | P -42 -42 -41 -41 -40 -40 | Q -24 -27 -29 -32 -34 -37 |
| H/29; | P -39 -39 -38 -38 -37 -37 | Q -21 -24 -26 -29 -31 -34 |
| H/30; | P -36 -36 -35 -35 -34 -34 | Q -18 -21 -23 -26 -28 -31 |
| H/31; | P -33 -33 -32 -32 -31 -31 | Q -15 -18 -20 -23 -25 -28 |
| H/32; | P -30 -30 -29 -29 -28 -28 | Q -12 -15 -17 -20 -22 -25 |
| H/33; | P -27 -27 -26 -26 -25 -25 | Q  -9 -12 -14 -17 -19 -22 |
| H/34; | P -24 -24 -23 -23 -22 -22 | Q  -6  -9 -11 -14 -16 -19 |
| H/35; | P -21 -21 -20 -20 -19 -19 | Q  -3  -6  -8 -11 -13 -16 |
| H/36; | P -18 -18 -17 -17 -16 -16 | Q   0  -3  -5  -8 -10 -13 |
| H/37; | P -15 -15 -14 -14 -13 -13 | Q   3   0  -2  -5  -7 -10 |
| H/38; | P -12 -12 -11 -11 -10 -10 | Q   6   3   1  -2  -4  -7 |
| H/39; | P  -9  -9  -8  -8  -7  -7 | Q   9   6   4   1  -1  -4 |
| H/40; | P  -6  -6  -5  -5  -4  -4 | Q  12   9   7   4   2  -1 |
| H/41; | P  -3  -3  -2  -2  -1  -1 | Q  15  12  10   7   5   2 |
| H/42; | P   0   0   1   1   2   2 | Q  18  15  13  10   8   5 |
| H/43; | P   3   3   4   4   5   5 | Q  21  18  16  13  11   8 |

As is apparent from Tables I and II, in the present embodiment of the invention, a signal Q for correction is generated, independently of the signal P for correction, by the addition with modulus 2 of six digital signals, and the number of common essential elements of the generation elements of the two correction signals P and Q is considered to be one (unity) or less. Furthermore, the correction signal P and its generation elements are so arranged as to belong to mutually different blocks. Similarly, the correction signal Q and its generation elements are also arranged so as to belong to mutually different blocks. By these arrangements, the probability of failure in restoration of the digital signals is very low as described hereinafter.

Figure 2:
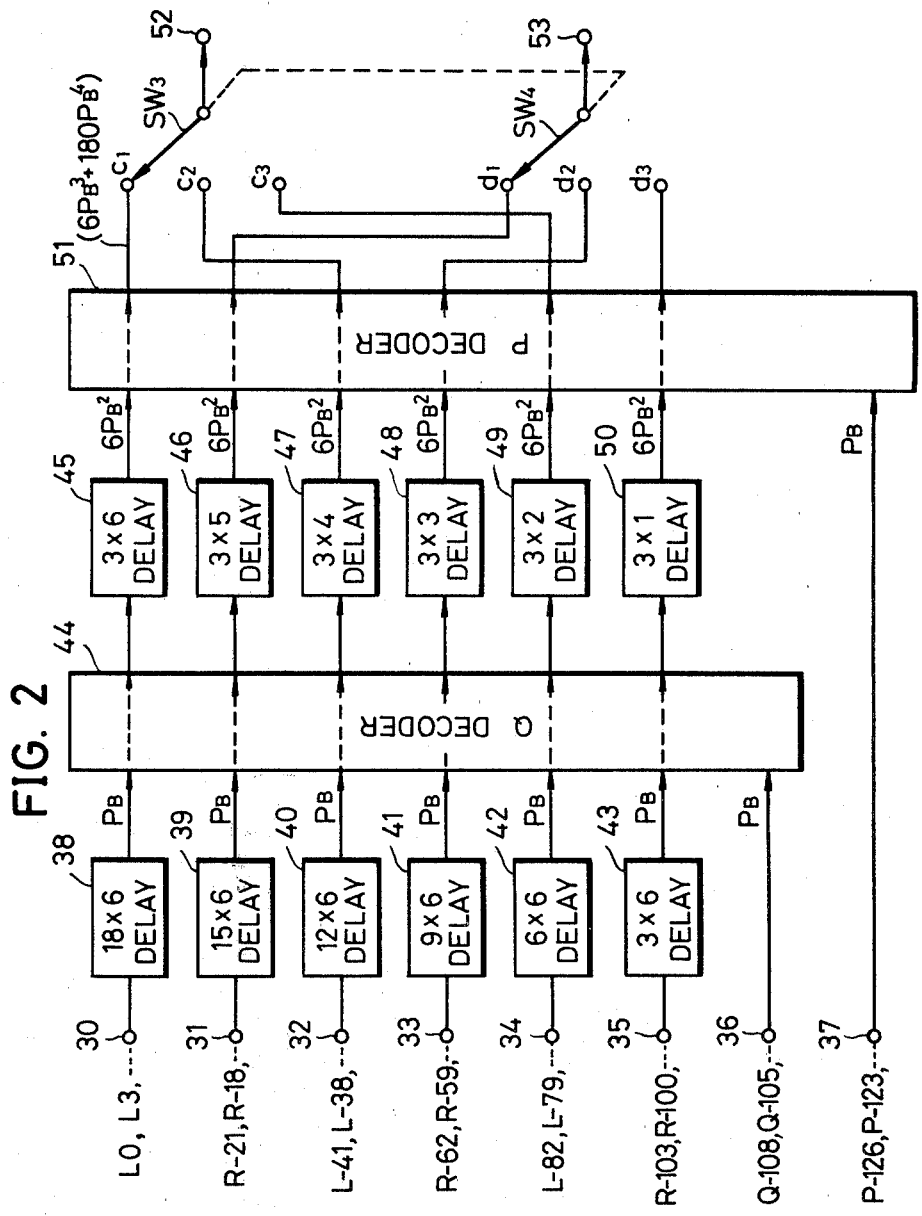
FIG. 2 is a block diagram showing the essential parts of the reproducing system of the same apparatus.

In the reproducing system shown in FIG. 2, the first L-ch digital signals L0, L3, L6,-reproduced from the magnetic tape and constituting block signals resulting from parallel-series conversion of block signals are applied to an input terminal 30, and first R-ch digital signals R-21, R-18, R-15,-are applied to an input terminal 31. Second L-ch digital signals L-41, L-38, L-35,-are applied to an input terminal 32, and second R-ch digital signals R-62, R-59, R-56,-are applied to an input terminal 33. Third L-ch digital signals L-82, L-79, L-76,-are applied to an input terminal 34, and third R-ch digital signal R-103, R-100, R-97,-are applied to an input terminal 35. The signals introduced into the input terminals 30 through 35 are respectively fed to the delay devices 38, 39, 40, 41, 42, and 43, where they are respectively delayed by 108(=18×6), 90(=15×6), 72(=12×6), 54(=9×6), 36(=6×6), and 18(=3×6) sampling periods. The resulting delayed signals are supplied together with the signal Q for reproduction correction to a Q-decoder 44 for restoring information lost, using the correction signal Q. In this Q decoder 44, the reproduction correction signal Q is decoded, because the elements which are the same as the generation elements (for example, at the time of reproduction of the block 35, L0, R-3, L-5, R-8, L-10 and R-13, from the table II) are being supplied from the delay devices 38 to 43. Even if there is one erroneous signal among the output signals of the delay devices 38 to 43, the digital signal which has the original generation constituent elements is restored, using the correction signal, as described above.

Accordingly, regardless whether the output signals of the delay devices 38 to 43 include any error or not, the original digital signals are restored by the Q-decoder 44. The resulting restored digital signals are respectively fed to delay devices 45 to 50, where they are respectively delayed by $18(=3\times6)$, $15(=3\times5)$, $12(=3\times4)$, $9(=3\times3)$, $6(=3\times2)$, and $3(=3\times1)$ sampling periods. The delayed output signals are supplied to a P-decoder 51. That is, the signal from the input terminal 30, for instance, is resultingly delayed by 126 sampling periods and is then supplied to the P-decoder 51.

The P-decoder 51 operates, when the output signals of the delay devices 45 to 50 include a signal error signal, to restore the error signal, using the correction signal P fed from the input terminal 37 and the delayed signals from the delay devices 45 to 50 which delayed signals have their generation elements which are the same as those of the correction signal P.

In this manner, the digital signals exactly restored and reproduced are obtained from the P-decoder 51. Among the digital signals, the L-ch signals sampled firstly, secondly and thirdly in the same block are respectively led to contact points c1, c2, and c3 of a changeover switch SW3, and the R-ch signals sampled firstly, secondly and thirdly are respectively led to contact points d1, d2, and d3 of a changeover switch SW4. The changeover switches SW3 and SW4 are changed over in intercoupled operation respectively in synchronism with the sampling period. Accordingly, from output terminals 52 and 53 are respectively led out the L-ch digital signal and the R-ch digital signal successively and in the correct order, which are then supplied to a D/A converter (not shown) where they are restored to the original stereophonic audio signal.

In the above described reproducing system, the probability of failure in restoration of the L-ch and R-ch output signals of the Q-decoder 44 is about $6P_B^2$ as set forth above, on the premise that error probability of each block is $P_B$. Moreover, since the correction signals P and Q respectively belong to different blocks so as to be mutually independent stochastic process, the probability of failure in restoration of the correction signal P is also $P_B$.

As a result, the probability of failure in restoration (error probability) of each of L-ch and R-ch output signals of the P-decoder 51 is expressed approximately as follows.

$$6P_B^2 \times (5\times 6P_B^2 + P_B) = 6P_B^3 + 180P_B^4 \qquad (2)$$

Accordingly, when the sampling frequency is 50 KHz and $P_B=10^{-3}$, the number of samples failed in restoration per one hour becomes as follows, by substituting in Eq.(2).

$$50\times 10^3 \times 3600 \times 2\times \{6\times(10^{-3})^3 + 180\times(10^{-3})^4\} \approx 2.2 \text{ (/hour)}$$

That is, according to the present embodiment, the number of samples filed in restoration per hour is on the order of two, compared to the number of samples 2160 failed in restoration in the system known heretofore, resulting in enhancement of quality of reproduction.

Further, the present embodiment can be also applied to the conventional reproducing system wherein either the Q-decoder 44 or the P-decoder 51 is omitted, thus having compatibility.

FIG. 3 shows important features of the recording system of the second embodiment according to the present invention. In FIG. 3, those parts which are the same as corresponding parts in FIG. 1 are designated by like reference numerals. Detailed description of such parts will not be repeated.

The present embodiment is characterized in that the correction signal Q' is generated based on the correction signal P.

The output correction signal P of the exclusive OR operational circuit 26 passes through a delay device 60 for delaying by $18(=3\times6)$ sampling period and is then fed to a 7-input, exclusive OR operational circuit 61, together with the output signals of the delay devices 12 to 16 and the signal from the contact point a1 of the changeover switch SW1. In the exclusive OR operational circuit 61, the modulus 2 addition is carried out to generate a correction signal Q'. This correction signal Q' is then delayed by $147(=21\times7)$ sampling periods by a delay device 62.

On the other hand, the output signals of the delay devices 12 to 16, and 60, which are supplied to the exclusive OR operational circuit 61, are respectively delayed by $42(=6\times7)$, $84(=12\times7)$, $21(=3\times7)$, $63(=9\times7)$, $105(15\times7)$, and $126(=18\times7)$ sampling periods by delay devices 63, 64, 65, 66, 67, and 68. The resulting delayed signals are fed, together with the signal from the contact point a1 of the changeover switch SW1 and the signal from the delay device 62, to a block signal forming device and checking signal generator 69, where they are subjected to parallel-series conversion, and a CRC signal is added thereto. The resulting signal is obtained, as block signal, every horizontal scanning period through an output terminal 70, and recorded.

The relationships between the block numbers of the block signals obtained in this manner and the modulated digital signals constituting the block signals are as indicated in Table III. In addition, the relationships between the block numbers and the signals P and Q' for correction are indicated in Table IV. The CRC signal is omitted in the tables.

TABLE III

| H/0;  | L 0  | R −24 | L −47 | R −71 | L −94 | R −118 |
|-------|------|-------|-------|-------|-------|--------|
| H/1;  | L 3  | R −21 | L −44 | R −68 | L −91 | R −115 |
| H/2;  | L 6  | R −18 | L −41 | R −65 | L −88 | R −112 |
| H/3;  | L 9  | R −15 | L −38 | R −62 | L −85 | R −109 |
| H/4;  | L 12 | R −12 | L −35 | R −59 | L −82 | R −106 |
| H/5;  | L 15 | R −9  | L −32 | R −56 | L −79 | R −103 |
| H/6;  | L 18 | R −6  | L −29 | R −53 | L −76 | R −100 |
| H/7;  | L 21 | R −3  | L −26 | R −50 | L −73 | R −97  |
| H/8;  | L 24 | R 0   | L −23 | R −47 | L −70 | R −94  |
| H/9;  | L 27 | R 3   | L −20 | R −44 | L −67 | R −91  |
| H/10; | L 30 | R 6   | L −17 | R −41 | L −64 | R −88  |
| H/11; | L 33 | R 9   | L −14 | R −38 | L −61 | R −85  |
| H/12; | L 36 | R 12  | L −11 | R −35 | L −58 | R −82  |
| H/13; | L 39 | R 15  | L −8  | R −32 | L −55 | R −79  |
| H/14; | L 42 | R 18  | L −5  | R −29 | L −52 | R −76  |
| H/15; | L 45 | R 21  | L −2  | R −26 | L −49 | R −73  |

TABLE III-continued

| | | | | | | |
|---|---|---|---|---|---|---|
| H/16; | L 48 | R 24 | L 1 | R −23 | L −46 | R −70 |
| H/17; | L 51 | R 27 | L 4 | R −20 | L −43 | R −67 |
| H/18; | L 54 | R 30 | L 7 | R −17 | L −40 | R −64 |
| H/19; | L 57 | R 33 | L 10 | R −14 | L −37 | R −61 |
| H/20; | L 60 | R 36 | L 13 | R −11 | L −34 | R −58 |
| H/21; | L 63 | R 39 | L 16 | R −8 | L −31 | R −55 |
| H/22; | L 66 | R 42 | L 19 | R −5 | L −28 | R −52 |
| H/23; | L 69 | R 45 | L 22 | R −2 | L −25 | R −49 |
| H/24; | L 72 | R 48 | L 25 | R 1 | L −22 | R −46 |
| H/25; | L 75 | R 51 | L 28 | R 4 | L −19 | R −43 |
| H/26; | L 78 | R 54 | L 31 | R 7 | L −16 | R −40 |
| H/27; | L 81 | R 57 | L 34 | R 10 | L −13 | R −37 |
| H/28; | L 84 | R 60 | L 37 | R 13 | L −10 | R −34 |
| H/29; | L 87 | R 63 | L 40 | R 16 | L −7 | R −31 |
| H/30; | L 90 | R 66 | L 43 | R 19 | L −4 | R −28 |
| H/31; | L 93 | R 69 | L 46 | R 22 | L 1 | R −25 |
| H/32; | L 96 | R 72 | L 49 | R 25 | L 2 | R −22 |
| H/33; | L 99 | R 75 | L 52 | R 28 | L 5 | R −19 |
| H/34; | L 102 | R 78 | L 55 | R 31 | L 8 | R −16 |
| H/35; | L 105 | R 81 | L 58 | R 34 | L 11 | R −13 |
| H/36; | L 108 | R 84 | L 61 | R 37 | L 14 | R −10 |
| H/37; | L 111 | R 87 | L 64 | R 40 | L 17 | R −7 |
| H/38; | L 114 | R 90 | L 67 | R 43 | L 20 | R −4 |
| H/39; | L 117 | R 93 | L 70 | R 46 | L 23 | R −1 |
| H/40; | L 120 | R 96 | L 73 | R 49 | L 26 | R 2 |
| H/41; | L 123 | R 99 | L 76 | R 52 | L 29 | R 5 |
| H/42; | L 126 | R 102 | L 79 | R 55 | L 32 | R 8 |
| H/43; | L 129 | R 105 | L 82 | R 58 | L 35 | R 11 |

TABLE IV

| | | Q $l_1$ $l_2$ $l_3$ $l_4$ $l_5$ $l_6$ $l_7$ |
|---|---|---|
| H/0; | P-144-144-143-143-142-142 | Q-147-150-152-155-157-160-165 |
| H/1; | P-141-141-140-140-139-139 | Q-144-147-149-152-154-157-162 |
| H/2; | P-138-138-137-137-136-136 | Q-141-144-146-149-151-154-159 |
| H/3; | P-135-135-134-134-133-133 | Q-138-141-143-146-148-151-156 |
| H/4; | P-132-132-131-131-130-130 | Q-135-138-140-143-145-148-153 |
| H/5; | P-129-129-128-128-127-127 | Q-132-135-137-140-142-145-150 |
| H/6; | P-126-126-125-125-124-124 | Q-129-132-134-137-139-142-147 |
| H/7; | P-123-123-122-122-121-121 | Q-126-129-131-134-136-139-144 |
| H/8; | P-120-120-119-119-118-118 | Q-123-126-128-131-133-136-141 |
| H/9; | P-117-117-116-116-115-115 | Q-120-123-125-128-130-133-138 |
| H/10; | P-114-114-113-113-112-112 | Q-117-120-122-125-127-130-135 |
| H/11; | P-111-111-110-110-109-109 | Q-114-117-119-122-124-127-132 |
| H/12; | P-108-108-107-107-106-106 | Q-111-114-116-119-121-124-129 |
| H/13; | P-105-105-104-104-103-103 | Q-108-111-113-116-118-121-126 |
| H/14; | P-102-102-101-101-100-100 | Q-105-108-110-113-115-118-123 |
| H/15; | P -99 -99 -98 -98 -97 -97 | Q-102-105-107-110-112-115-120 |
| H/16; | P -96 -96 -95 -95 -94 -94 | Q -99-102-104-107-109-112-117 |
| H/17; | P -93 -93 -92 -92 -91 -91 | Q -96 -99-101-104-106-109-114 |
| H/18; | P -90 -90 -89 -89 -88 -88 | Q -93 -96 -98-101-103-106-111 |
| H/19; | P -87 -87 -86 -86 -85 -85 | Q -90 -93 -95 -98-100-103-108 |
| H/20; | P -84 -84 -83 -83 -82 -82 | Q -87 -90 -92 -95 -97-100-105 |
| H/21; | P -81 -81 -80 -80 -79 -79 | Q -84 -87 -80 -92 -94 -97-102 |
| H/22; | P -78 -78 -77 -77 -76 -76 | Q -81 -84 -86 -89 -91 -94 -99 |
| H/23; | P -75 -75 -74 -74 -73 -73 | Q -78 -81 -83 -86 -88 -91 -96 |
| H/24; | P -72 -72 -71 -71 -70 -70 | Q -75 -78 -80 -83 -85 -88 -93 |
| H/25; | P -69 -69 -68 -68 -67 -67 | Q -72 -75 -77 -80 -82 -85 -90 |
| H/26; | P -66 -66 -65 -65 -64 -64 | Q -69 -72 -74 -77 -79 -82 -87 |
| H/27; | P -63 -63 -62 -62 -61 -61 | Q -66 -69 -71 -74 -76 -79 -84 |
| H/28; | P -60 -60 -59 -59 -58 -58 | Q -63 -66 -68 -71 -73 -76 -81 |
| H/29; | P -57 -57 -56 -56 -55 -55 | Q -60 -63 -65 -68 -70 -73 -78 |
| H/30; | P -54 -54 -53 -53 -52 -52 | Q -57 -60 -62 -65 -67 -70 -75 |
| H/31; | P -51 -51 -50 -50 -49 -49 | Q -54 -57 -59 -62 -64 -67 -72 |
| H/32; | P -48 -48 -47 -47 -46 -46 | Q -51 -54 -56 -59 -61 -64 -69 |
| H/33; | P -45 -45 -44 -44 -43 -43 | Q -48 -51 -53 -56 -58 -61 -66 |
| H/34; | P -42 -42 -41 -41 -40 -40 | Q -45 -48 -50 -53 -55 -58 -63 |
| H/35; | P -39 -39 -38 -38 -37 -37 | Q -42 -45 -47 -50 -52 -55 -60 |
| H/36; | P -36 -36 -35 -35 -34 -34 | Q -39 -42 -44 -47 -49 -52 -57 |
| H/37; | P -33 -33 -32 -32 -31 -31 | Q -36 -39 -41 -44 -46 -49 -54 |
| H/38; | P -30 -30 -29 -29 -28 -28 | Q -33 -36 -38 -41 -43 -46 -51 |
| H/39; | P -27 -27 -26 -26 -25 -25 | Q -30 -33 -35 -38 -40 -43 -48 |
| H/40; | P -24 -24 -23 -23 -22 -22 | Q -27 -30 -32 -35 -37 -40 -45 |
| H/41; | P -21 -21 -20 -20 -19 -19 | Q -24 -27 -29 -32 -34 -37 -42 |
| H/42; | P -18 -18 -17 -17 -16 -16 | Q -21 -24 -26 -29 -31 -34 -39 |
| H/43; | P -15 -15 -14 -14 -13 -13 | Q -18 -21 -23 -26 -28 -31 -36 |

In the Table IV, $Ql_1l_2l_3l_4l_5l_6l_7$ represents a signal Q' for correction which is generated by the addition with modulus 2 of each digital signal at $Ll_1$, $Rl_2$, $Ll_3$, $Rl_4$, $Ll_5$, and $Rl_6$, and the correction signal P the generation element of which is $Ll_7$. Accordingly, in the Table IV, the correction signal Q' at the block number 40, for instance, is formed or generated by the addition with modulus 2 of each digital signals of L-27, R-30, L-32, R-35, L-37, and R-40, and the correction signal at the block number 33. Moreover, it is understood from the Tables III and IV that the number of common essential elements of the generation elements of the two correction signals P and Q' is considered to be one(unity) or less, and that the correction signals P and Q' and their generation elements are so arranged as to belong to mutually different blocks.

FIG. 4 shows important features of the reproducing system of the second embodiment according to the present invention. In FIG. 4, those parts which are the same as corresponding parts in FIG. 2 are designated by like reference numerals. Detailed description of such parts will not be repeated.

The reproduced digital signals and the correction signal delayed by 147(=21×7), 126(=18×7), 105(=15×7), 84(=12×7), 63(=9×7), 42(=6×7), and 21(=3×7) by delay devices 81, 82, 83, 84, 85, 86, and 87 are supplied, together with the correction signal Q' from the input terminal 37, to a Q-decoder 88. There, in the case where a single element of Q' generation elements constituting the reproduced block signal is erroneous, said erroneous generation element is restored, using the correction signals P and Q'. Each output signals of the delay devices 81 to 86 passes through the Q-decoder 88 and is then further delayed by the delay devices 45 to 50. The resulting delayed signals are fed, together with the signal from the delay device 87, to a P-decoder 89. The digital signal supplied to the P-decoder 89 is resultingly the same as the generation elements of the reproduced correction signal P. Accordingly, in the case where a single generation element is erroneous among the generation elements of the reproduced correction signal P, said erroneous generation element is similarly restored based on the above described operational principle.

In the reproducing system indicated in FIG. 4, the probability of failure in restoration of each output signal L-ch and R-ch signals P of the Q-decoder 88 becomes about $7P_B{}^2$ when the error probability of each block is assumed to be $P_B$.

The error probability of L-ch and R-ch signals P of the P-decoder 89 (which means the probability of failure in restoration at the Q-decoder 88) is $7P_B{}^2$. Moreover, as is apparent from the Tables III and IV, signals are arranged, belonging to mutually different blocks, so that the probability of failure in restoration at the Q-decoder 88 and the probability of failure in restoration at the P-decoder 89 become independent stochastic process. Therefore, the probability of failure in restoration of each digital signal of L-ch and R-ch, at the time instance when P-decoding is completed, is expressed as follows.

$$7P_B{}^2 \times (6 \times 7P_B{}^2) = 294 P_B{}^4 \qquad (3)$$

Accordingly, when the sampling frequency is 50 KHz and $P_B = 10^{-3}$, by substituting them in Eq.(2), the number of samples failed in restoration per hour becomes as follows.

$$50 \times 10^3 \times 3600 \times 2 \times \{294 \times (10^{-3})^4\} = 0.1 \text{ (/hour)}$$

This means that the number of samples filed in restoration per hour is about 0.1, that is, about one sample per ten hours, which is 1/20 times the number of samples failed in restoration in the above described first embodiment and is 1/20,000 times 2,160 samples in the conventional example. From this, it is understood that the present embodiment is capable of performing digital signal recording and reproducing operation with good quality in compared with the first embodiment as well as the conventional system.

In the reproducing system indicated in FIG. 4, the Q-decoder 88 may be omitted, which results in simplified circuit arrangement with accompanying somewhat deterioration of restoration capability. This circuit arrangement can also be applied to the conventional reproducing system having only the P-decoder, thus having compatibility.

The constitution of the correction signal P, Q, or Q' is not limited to that in the above described embodiment, but may be of word constitution such as indicated in FIG. 5.

Words $_1P_{i+mD}$, $_1P_i$, $_1P_{i+(m-1)D}$ may be expressed as follows.

$$\left.\begin{array}{l} _1P_{i+mD} = {_1W_i} \oplus {_2W_{i+D}} \oplus \cdots \oplus {_mW_{i+(m-1)D}} \\ _1P_i = {_1W_{i+D}} \oplus {_2W_{i+2D}} \oplus \cdots \oplus {_mW_{i+mD}} \\ \vdots \\ _1P_{i+(m-1)D} = {_1W_{i+mD}} \oplus {_2W_i} \oplus \cdots \oplus {_mW_{i+(m-2)D}} \end{array}\right\}$$

$B_i$ to $B_{i+mD}$ respectively designate blocks. $_1W_i$ to $_1W_{i+mD}$, $_2W_i$ to $_2W_{i+mD}$,–designate words, which respectively correspond to generation elements of the aforementioned aggregation $, that is, digital signals of one sampling period.

Furthermore, the correction signal Q may be generated as follows.

$$\left.\begin{array}{l} _1Q_{i+mD'} = {_1W_i} \oplus {_2W_{i+D'}} \oplus \cdots \oplus {_mW_{i+(m-1)D'}} \\ _1Q_i = {_1W_{i+D'}} \oplus {_2W_{i+2D'}} \oplus \cdots \oplus {_mW_{i+mD'}} \\ \vdots \\ _1Q_{i+(m-1)D'} = {_1W_{i+mD'}} \oplus {_2W_i} \oplus \cdots \oplus {_mW_{i+(m-2)D'}} \end{array}\right\}$$

The reproducing system indicated in FIG. 2 and FIG. 4 may be arranged so that the order of Q-decoding and P-decoding operation is reversed.

Furthermore, the first embodiment may be modified in a manner such that the number of generation elements of the correction signals P and Q is different to each other. In addition, in the second embodiment, the correction signal Q' may be generated by the addition with modulus 2 of a plurality of correction signals P and elements which is integral multiple of the number of correction signals P.

Further, this invention is not limited to these embodiments but various variations and modifications may be made without departing from the scope of the invention.

What I claim is:

1. A digital signal processing apparatus for use in recording a composite digital signal composed of modulated digital signals, obtained by digitally processing an information signal with a specific sampling period and composite synchronizing signals, and reproducing the same to restore an original information signal, said digital signal processing apparatus comprising:

time-multiplexing means provided with an input signal;

a first correction signal generation circuit supplied with the output of said time-multiplexing means, in which, by considering a digital signal of one sampling period as an element, and from a group $ comprising a plurality of said elements, each of m (m is a given integer) elements undergo a modulo-2 addition, forming a first correction signal p by use of said elements of said group $ without duplication, for producing a group P of said first correction signal p by similarly using all the elements in said group $ only once;

a first delay device group supplied with the output of said time-multiplexing means, for selecting n (n is a given integer) elements at a time from said group $ without duplication with less than or equal to one element in common with said generation element of said correction signal p;

a second correction signal generation circuit supplied with the output of said first delay device group, for forming a second correction signal q by the modulo-2 addition of said selected elements from said first delay device group, and also similarly producing a group Q comprising said second correction signal q by using all the elements in said group $ only once;

a second delay device group supplied with the outputs of said first and second correction signal generation circuits, for producing L/m (L is a multiple of m and n) first correction signal p and L/n second correction signal q of said groups P and Q, respectively, in response to the outputs of said first and second correction signal generation circuits;

a third delay device group supplied with the output of said first delay device group, for selecting L elements of said group $ excluding said elements forming said first and second correction signals from the output of said first delay device group;

a block signal forming device supplied with the outputs of said second and third delay device groups, for generating an output block signal which is recorded onto a recording medium in the form of a digital signal; and a restoration circuit supplied with the first and second correction signals together with the generation elements thereof, both of which are reproduced from the recording medium, to restore the generation elements;

said block signal forming device forming the block signal from the outputs of said second and third delay device groups and an error checking signal, in such a manner that the delayed first and second correction signals p and q and their generation elements form mutually different block signals.

2. A digital signal processing apparatus as described in claim 1 in which said time-multiplexing means comprises means for selecting m generation elements as a unit without duplication from said group $, said means comprising m changeover switches changed over successively every sampling period in response to each of said m information signals.

3. A digital signal processing apparatus as described in claim 1 in which said first and second correction signal generation circuits respectively have exclusive-OR operational circuits for carrying out said modulo-2 addition.

4. A digital signal processing apparatus as described in claim 1 in which:

said first delay device group comprises a first delay device for respectively delaying two generation elements supplied as input during the first sampling period so that there is a deviation of three sampling periods between the two generation elements, a second delay device for respectively delaying two generation elements supplied as input during the second sampling period and delaying by six more sampling periods than said first delay device so that there is a deviation of three sampling periods between the two generation elements, and a third delay device for respectively delaying two generation elements supplied as input during the third sampling period and delaying by six more sampling periods than said second delay device so that there is a deviation of three sampling periods between the two generation elements;

said second delay device group comprises delay devices for respectively delaying said first and second correction signals p and q so that there is a deviation of eighteen sampling periods between the first and second correction signals;

said third delay device group comprises a fourth delay device for respectively delaying two generation elements supplied as input during the first sampling period so that there is a deviation of eighteen sampling periods between the two generation elements, a fifth delay device for respectively delaying two generation elements supplied as input during the second sampling period and delaying by thirty-six more sampling periods than said fourth delay device so that there is a deviation of eighteen sampling periods between the two generation elements, and a sixth delay device for respectively delaying two generation elements supplied as input during the third sampling period and delaying by thirty-six more sampling periods than said fifth delay device so that there is a deviation of thirty-six sampling periods between the two generation elements; and said time-multiplexing means repeatedly changing over and supplying said two generation elements to said first through third delay devices and said fourth through sixth delay devices as input every sampling period.

5. A digital signal processing apparatus for use in recording a composite digital signal composed of modulated digital signals, obtained by digitally processing an information signal with a specific sampling period and composite synchronizing signals, and reproducing the same to restore an original information signal, said digital signal processing apparatus comprising:

a first correction signal generation circuit supplied with an input signal, in which, by considering a digital signal of one sampling period as an element, and from a group $ comprising a plurality of said elements, each of m (m is a given integer) elements undergo a modulo-2 addition, forming a first correction signal p by use of said elements of said group $ without duplication, for producing a group P of said first correction signal p by similarly using all the elements in said group $ only once;

a second correction signal generation circuit for producing a second correction signal q' through a modulo-2 addition of l (l is an integer) first correction signal p obtained from said group P comprising said first correction signal p and lm elements obtained from said group $ without duplication, and also similarly producing a group Q' comprising said second correction signal q' by respectively using all the elements in said groups P and $ only once;

a delay device group for producing l first correction signal p and one second correction signal q' from said groups P and Q', and lm elements of said group $ comprising generation elements other than the generation elements of said first and second correction signals;

a block signal forming device for forming one block signal from the output of said delay device group and an error checking signal in such a manner that said first and second correction signals p and q' and their generation elements form mutually different block signals, the output block signal of said block signal forming device being recorded and reproduced with respect to a recording medium; and a restoration circuit supplied with the generation elements of at least said first correction signal p from among said first and second correction signals p and q', which are reproduced from said recording medium, for restoring generation elements of said first and second correction signals based on said first and second correction signals formed by said generation elements.

6. A digital signal processing apparatus as described in claim 5 in which means in said first correction signal generation circuit for selecting m elements from said group $ without duplication, are m changeover switches which successively change over every sampling period in response to m information signals.

7. A digital signal processing apparatus as described in claim 5 in which said first and second correction signal generation circuits respectively comprise exclusive-OR operational circuits for the modulo-2 addition operation.

8. A digital signal processing apparatus as claimed in claim 5 in which said delay device group comprises:

a first delay device group for respectively delaying two generation elements supplied successively without duplication as input every sampling period and delaying by forty-eight more sampling periods than the previous period so that there is a deviation of twenty-four sampling periods between the two generation elements;

a second delay device group for delaying said first correction signal obtained from said first correction signal generation circuit by one hundred forty-four sampling periods; and a delay device for delaying said second correction signal obtained from said second correction signal generation circuit by one hundred forty-seven sampling periods.

* * * * *